(12) United States Patent
Safai

(10) Patent No.: US 11,884,789 B2
(45) Date of Patent: *Jan. 30, 2024

(54) MANUFACTURE OF PREPREG COMPOSITIONS, AND DETERMINATION OF THEIR SUITABILITY FOR USE IN COMPOSITE STRUCTURES

(71) Applicant: The Boeing Company, Chicago, IL (US)

(72) Inventor: Morteza Safai, Newcastle, WA (US)

(73) Assignee: The Boeing Company, Arlington, VA (US)

( * ) Notice: Subject to any disclaimer, the term of this patent is extended or adjusted under 35 U.S.C. 154(b) by 445 days.

This patent is subject to a terminal disclaimer.

(21) Appl. No.: 16/823,219

(22) Filed: Mar. 18, 2020

(65) Prior Publication Data

US 2020/0277463 A1    Sep. 3, 2020

Related U.S. Application Data

(62) Division of application No. 14/503,201, filed on Sep. 30, 2014, now Pat. No. 11,725,088.

(51) Int. Cl.
*C08J 5/24*    (2006.01)

(52) U.S. Cl.
CPC ..................... *C08J 5/249* (2021.05)

(58) Field of Classification Search
CPC ....................................... C08J 5/249
See application file for complete search history.

(56) References Cited

U.S. PATENT DOCUMENTS

| 6,538,725 | B2 * | 3/2003 | Potyrailo ............... G01N 21/88 |
| | | | 356/237.2 |
| 6,794,265 | B2 | 9/2004 | Lee et al. |
| 7,935,419 | B1 | 5/2011 | Hollingsworth et al. |
| 7,955,858 | B2 | 6/2011 | Davis et al. |
| 8,361,823 | B2 | 1/2013 | Kahen |
| 8,530,861 | B1 | 9/2013 | Anderson et al. |
| 9,303,205 | B2 | 4/2016 | Smith et al. |

(Continued)

FOREIGN PATENT DOCUMENTS

KR    20140034363 A    3/2014

OTHER PUBLICATIONS

Calado, "2. Thermoset Resin Cure Kinetics and Rheology," in Dave and Loos (eds.), "Processing of Composites," Hanser Verlag GmbH, Cincinnati, Ohio, 2000, pp. 32-107. (Year: 2000).*

(Continued)

*Primary Examiner* — Monique R Jackson
(74) *Attorney, Agent, or Firm* — Kolisch Hartwell, P.C.

(57) ABSTRACT

A method of manufacturing a prepreg composition includes disposing a plurality of core/shell quantum dots on or in a resin matrix of the prepreg composition. The quantum dots may include an inner core that when excited by light of a first wavelength emits a detectable luminescent signal, and an outer shell that blocks light of the first wavelength from reaching the inner core when the outer shell is intact. A method of determining the suitability of a pre-impregnated composite fiber material for incorporation into a composite structure and a method of detecting damage to a prepreg composition due to ultraviolet radiation exposure utilizing the core/shell quantum dots are provided.

20 Claims, 5 Drawing Sheets

(56) References Cited

U.S. PATENT DOCUMENTS

| | | |
|---|---|---|
| 9,671,386 B2 | 6/2017 | Flinn et al. |
| 2003/0010987 A1 | 1/2003 | Banin et al. |
| 2005/0054004 A1 | 3/2005 | Alivisatos et al. |
| 2010/0013376 A1 | 1/2010 | Maskaly et al. |
| 2010/0239848 A1 | 9/2010 | Le Corvec |
| 2010/0308271 A1 | 12/2010 | Bartel |
| 2012/0281428 A1 | 11/2012 | Davis et al. |
| 2013/0048841 A1 | 2/2013 | Hunt et al. |
| 2013/0134366 A1 | 5/2013 | Battaglia et al. |
| 2013/0230866 A1 | 9/2013 | Miyashita et al. |
| 2014/0299253 A1* | 10/2014 | Minamida ............... B32B 7/06 156/64 |
| 2014/0328369 A1* | 11/2014 | Flinn ................. G01N 33/442 374/57 |

OTHER PUBLICATIONS

Wang, "Novel Fluorescence Method for Cure Monitoring of Epoxy Resins," Polymer 27(10): 1529-1532, Oct. 1986. (Year: 1986).*

Costa-Fernandez, "The use of luminescent quantum dots for optical sensing," Trends in Analytical Chemistry, vol. 25, No. 3, 2006, pp. 207-218. (Year: 2006).*

Howie, T. et al., "Detection of Thermal Damage of CFRP Using Fluorescent Thermal Damage Probes", SAMPE Technical Conference, Charleston, SC (Oct. 23, 2012). (Year: 2012).*

Mohan et al., Facile synthesis of transparent and fluorescent epoxy-CdSe-CdS-ZnS core-multi shell polymer nanocomposites, published online Oct. 10, 2013, New J. Chem. vol. 38, pp. 155-162.

Machine Translation of KR20140034363A, published on Mar. 20, 2014.

U.S. Patent and Trademark Office, Non-Final Office Action regarding U.S. Appl. No. 14/503,201, dated Jun. 16, 2021, 19 pages.

Reed et al., Spatial quantization in GaAs-AIGaAs multiple quantum dots, J. Vac. Sci. Technol. B 4 (1), Jan./Feb. 1986, pp. 358-360.

Dabbousi et al., "(CdSe)ZnS Core—Shell Quantum Dots: Synthesis and Characterization of a Size Series of Highly Luminescent Nanocrystallites", The Journal of Physical Chemistry B, 1997, vol. 101, No. 46, pp. 9463-9475.

Van Embden et al., Nucleation and Growth of CdSe Nanocrystals in a Binary Ligand System, Langmuir, vol. 21, No. 22, 2005, American Chemical Society, pp. 10226-10233.

QDOT ITK Carboxyl Quantum Dots, Product Literature, Invitrogen, Dec. 2007, downloaded from ThermoFisher Scientific, 11 pages.

Tiption, Bradford, "Prevention of Environmentally Induced Degradation of Carbon/Epoxy Composite Material Via Implementation of a Polymer Based Coating System", Doctoral dissertation, University of Central Florida Orlando, Florida, 2008, 123 pages.

Striccoli et al., Nanocrystal-Based Polymer Composites as Novel Functional Materials, 2009, Z.M. Wang (ed.), Toward Functional Nanomaterials, Lecture Notes in Nanoscale Science and Technology, pp. 173-192.

Wood et al., Colloidal quantum dot light-emitting devices, Nano Reviews, 2010, 1:5202, pp. 1-7.

ASTM International, "Standard Test Method for Resin Flow of Carbon Fiber-Epoxy Prepreg", Designation: D3531/D3531M-11, 2011, 3 pages.

Trinchi et al., "Distributed quantum dot sensors for monitoring the integrity of protective aerospace coatings", In Aerospace Conference, 2012 IEEE, pp. 1-9.

Jang et al., Preparation of a photo-degradation resistant quantum dot-polymer composite plate for use in the fabrication of a high-stability white-light-emitting diode, 2013, Nanotechnology, vol. 24, 045607, pp. 1-9.

MSDS (Material Safety Data Sheets), QDOT 525 ITK Amino (PEG) Quantum Dots, Life Technologies, Dec. 2013, downloaded from ThermoFisher Scientific, 4 pages.

MSDS (Material Safety Data Sheets), QDOT 545 ITK Amino (PEG) Quantum Dots, Life Technologies, Dec. 2013, downloaded from ThermoFisher Scientific, 4 pages.

QDOT Nanocrystal Technology Overview, downloaded from ThermoFisher Scientific on Jul. 11, 2018, 3 pages.

U.S. Patent and Trademark Office, Non-Final Office Action regarding U.S. Appl. No. 14/503,201, dated Jan. 23, 2018, 20 pages.

U.S. Patent and Trademark Office, Non-Final Office Action regarding U.S. Appl. No. 14/503,201, dated Jul. 20, 2018, 24 pages.

U.S. Patent and Trademark Office, Non-Final Office Action regarding U.S. Appl. No. 14/503,201, dated Mar. 19, 2019, 32 pages.

U.S. Patent and Trademark Office, Final Office Action regarding U.S. Appl. No. 14/503,201, dated Feb. 28, 2022, 12 pages.

* cited by examiner

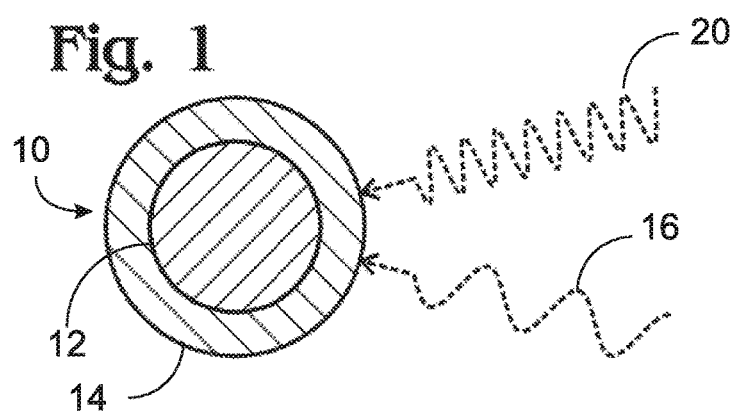
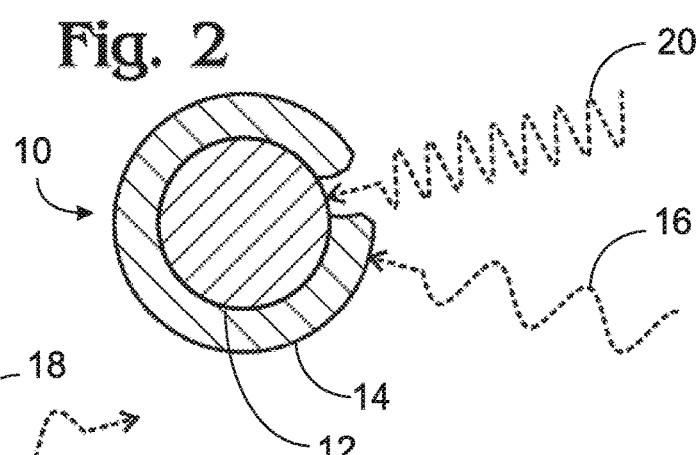
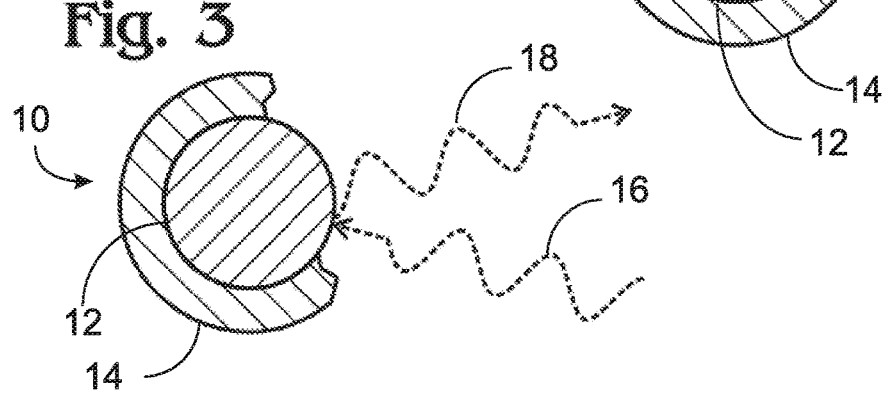

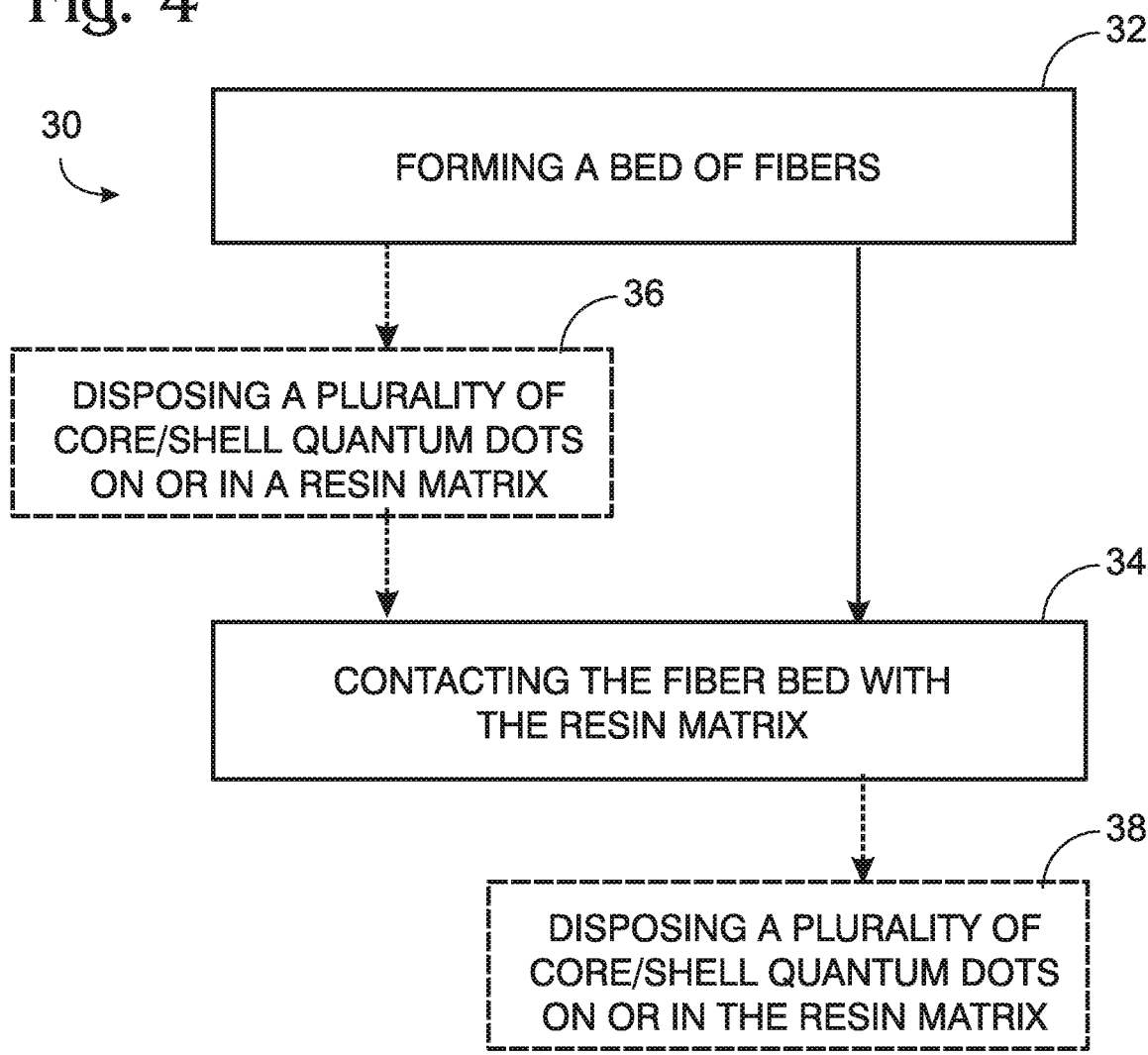

MANUFACTURE OF PREPREG COMPOSITIONS, AND DETERMINATION OF THEIR SUITABILITY FOR USE IN COMPOSITE STRUCTURES

CROSS-REFERENCE TO RELATED APPLICATION

This is a divisional application under 35 U.S.C. § 121 of U.S. patent application Ser. No. 14/503,201, filed Sep. 30, 2014 and issued as U.S. Pat. No. 11,725,088 on Aug. 15, 2023, which is incorporated herein by reference for all purposes.

FIELD

This disclosure relates to the manufacture of composite materials, and more specifically to the manufacture of pre-impregnated composite fiber materials, or prepreg.

BACKGROUND

Composite materials may be used in a wide variety of industries, particularly in applications where strength, stiffness, and decreased weight are desirable. In some applications, the manufacturing process may be simplified and/or streamlined through the use of prepreg.

Prepreg refers to intermediate materials that include "pre-impregnated" composite fibers, or fibers bound in a matrix material such as a resin. In prepreg, however, the matrix is only partially cured to allow easy handling. This B-Stage material may require cold storage in order to slow and/or prevent complete curing of the matrix. However, while heat may accelerate polymerization of pre-preg material, exposure to ultraviolet (UV) radiation may also result in an undesirable degree of premature polymerization.

UV light can be generated from many sources, such as the sun, standard florescent lights, mercury lamps, hydrogen lamps, and xenon arc lamps. Unfortunately, UV light can have a significant effect on carbon-based materials such as reinforced plastics, and in particular on uncured resins that may be used in the manufacture of composite materials.

As a result, some prepreg may be given a projected useful lifetime based upon an estimated exposure of the prepreg to known or suspected sources of UV radiation. Unfortunately, such calculated lifetimes may not reflect actual UV exposure, resulting in the use of potentially unsuitable materials in manufacture, or may actually overestimate UV exposure, resulting in the wasteful and unnecessary discarding of costly materials.

SUMMARY

The present disclosure provides prepreg compositions methods of manufacturing prepreg compositions, and methods for determining the suitability of a prepreg composition for use in fabricating composite structures.

In some embodiments, the disclosure may provide methods of manufacturing a prepreg composition, comprising forming a bed of fibers, contacting the fiber bed with a resin matrix, and disposing a plurality of core/shell quantum dots on or in the resin matrix. The core/shell quantum dots of the method may include an inner core covered by an outer shell, the inner core being configured such that when it is excited by light of a first wavelength the inner core emits a detectable luminescent signal at a second wavelength, while the outer shell may be configured to substantially block light of the first wavelength from reaching the inner core when the outer shell is intact. The outer shell may be further configured so that exposing the outer shell to a threshold amount of UV radiation may result in sufficient degradation of the outer shell that the inner core may emit the detectable luminescent signal when the quantum dot is illuminated by light having the first wavelength, where the threshold amount of UV radiation is that amount that is sufficient to render the prepreg composition unsuitable for use in fabricating composite structures.

In some embodiments, the disclosure may provide a prepreg composition that includes a bed of fibers disposed in a resin matrix, and a plurality of core/shell quantum dots. The quantum dots may comprise an inner core covered by an outer shell, the inner core being configured such that when excited by light of a first wavelength the inner core emits a detectable luminescent signal at a second wavelength, and where the outer shell is configured to substantially block light of the first wavelength from reaching the inner core when the outer shell is intact. The quantum dot outer shell may be further configured so that exposure to a threshold amount of UV radiation results in sufficient degradation that the inner core emits the detectable luminescent signal when the quantum dot is illuminated by light at the first wavelength, where the threshold amount of UV radiation is the amount sufficient to render the prepreg composition unsuitable for use in fabricating composite structures.

In some embodiments, the disclosure may provide a method of determining the suitability of a prepreg composition for incorporation into a composite structure, where the prepreg composition comprises a bed of fibers disposed in a resin matrix, and a plurality of core/shell quantum dots disposed on or in the resin matrix. Each quantum dot may include an inner core covered by an outer shell, where the inner core is configured so that when it is excited by light at a first wavelength the inner core emits a detectable luminescent signal at a second wavelength, and an outer shell that is configured to substantially block light of the first wavelength from reaching the inner core when the outer shell is intact. The outer shell may be further configured to degrade upon exposure to UV radiation, so that a detection of the luminescent signal at the second wavelength indicates that the quantum dot has been exposed to UV radiation. The method includes illuminating the prepreg composition with light of the first wavelength, detecting the luminescent signal at the second wavelength from the quantum dots, and determining a suitability of the prepreg composition for incorporation in a composite structure based upon at least the detected luminescent signal at the second wavelength.

The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a schematic depiction of an illustrative core/shell quantum dot exposed to both UV radiation and radiation having a first wavelength.

FIG. 2 is a schematic depiction of the illustrative core/shell quantum dot of FIG. 1, showing degradation of the outer shell by exposure to UV radiation.

FIG. 3 is a schematic depiction of the illustrative core/shell quantum dot of FIG. 1, showing the illumination of the inner core by radiation having a first wavelength, and the emission of radiation having a second wavelength.

FIG. 4 is a flowchart depicting an illustrative method of manufacturing a pre-impregnated composite material that comprises core/shell quantum dots.

DESCRIPTION

Overview

Figure 5:
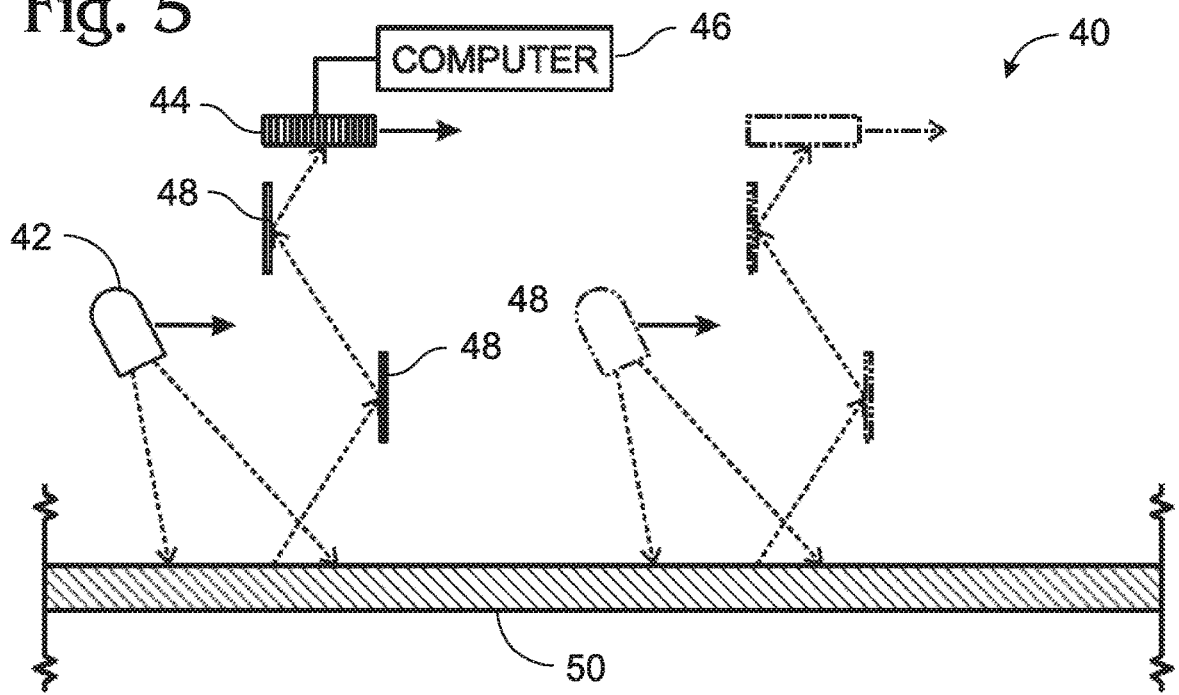
FIG. 5 is a schematic depiction of an illustrative apparatus for detecting the exposure of a prepreg composition to UV radiation.

Various embodiments of a pre-impregnated composite materials that incorporate core/shell quantum dots are described below and illustrated in the associated drawings. Unless otherwise specified, the pre-impregnated composite materials and/or their various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar composite materials. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Quantum Dots

Quantum dots typically refer to nanoclusters, or nanoparticles, of a semiconducting material, so called because they may have diameters in the range of 2-10 nanometers. Quantum dots may display unique electronic and optical properties, including luminescence. Generally, as the size of the quantum dot decreases, the luminescence emission shifts from longer wavelength to shorter wavelengths. As a result, quantum dots can be tuned during manufacturing to emit any color of light by altering the size and/or composition of the nanoparticles.

The efficiency and brightness of such semiconductor quantum dots may be enhanced by applying a shell of another, higher band gap semiconducting material around the nanocluster. Quantum dots having a semiconducting material embedded within another having a wider band gap may be known as core/shell quantum dots (CSQDs) or core/shell semiconducting nanocrystals (CSSNCs).

EXAMPLES, COMPONENTS, AND ALTERNATIVES

The following examples describe selected aspects of exemplary prepreg compositions, their components, their manufacture, and/or their characterization. These examples are intended for illustration and should not be interpreted as limiting the entire scope of the present disclosure. Each example may include one or more distinct inventions, and/or contextual or related information, function, and/or structure.

Example 1

This example describes an illustrative core/shell quantum dot for use in an exemplary prepreg composition. As shown in FIG. 1, core/shell quantum dot 10 includes an inner core 12 surrounded by an outer shell 14. The composition and/or size of the core and shell may be tailored to produce a quantum dot that exhibits desired optical properties.

The core/shell quantum dots of the present disclosure may be selected and/or configured so that the quantum dots exhibit a detectable optical response when exposed to an amount of UV radiation considered sufficient to render the resin matrix of an associated prepreg composition unsuitable for use in fabricating composite structures. A detectable optical response generally comprises a change in, or an occurrence of, an optical signal that is detectable by direct visual observation and/or by suitable instrumentation. Typically, the detectable optical response is a change in a spectral property of the quantum dot, such as a change in absorbance or a change in luminescence. Such changes may include changes in wavelength and/or intensity. Where the detectable optical response is a detectable luminescence response, the changes may include changes in the intensity, polarization, lifetime, and/or excitation or emission wavelength distribution of the luminescence, among others. For example, a condition of interest or change in condition may be measured as the appearance of increase of sample luminescence. In one illustrative example, the core/shell quantum dots of the present disclosure may be selected and/or configured so that the quantum dots exhibit a detectable luminescent response when exposed to an amount of UV radiation determined to be sufficient to render the resin matrix of an associated prepreg composition unsuitable for incorporation in a composite structure.

For example, a core/shell quantum dot 10 may be prepared or selected to possess photophysical properties such that the inner core 12 of quantum dot 10 is capable of being excited by light having a selected first wavelength 16, and that after excitation, the core 12 may then emit luminescence at a second wavelength 18.

The outer shell 14 of quantum dot 10 may be prepared or selected so that it is at least substantially not excited by light having a first wavelength 16, and so at least substantially nonluminescent at the second wavelength 18 upon illumination by light 16. However, outer shell 14 may be configured to absorb ultraviolet (UV) wavelengths of radiation 20, and to undergo degradation when exposed to UV radiation 20. In one illustrative embodiment, the absorbance spectrum of the outer shell 14 is configured to at least partially match the absorbance spectrum of a resin used in manufacturing prepreg compositions, particularly in or near the UV region.

In FIG. 1, quantum dot 10 is intact, including outer shell 14, and even upon illumination by light of a first wavelength 16 the quantum dot is substantially nonluminescent. However, upon illumination of quantum dot 10 with UV radiation 20 the outer shell 14 begins to degrade, as shown in FIG. 2. Upon additional exposure to UV radiation, outer shell 14 will degrade sufficiently that light having a first wavelength 16 may reach inner core 12.

As shown in FIG. 3, once outer shell 14 is degraded sufficiently, light having the first wavelength 16 can reach and therefore can excite the inner core 12, thereby stimulating a luminescence emission at a second wavelength 18.

The amount of UV radiation exposure that is needed before illumination of quantum dot 10 at the first wavelength results in a detectable emission at the second wavelength may be considered to correspond to an amount of UV radiation sufficient to degrade outer shell 14. It should be appreciated that while the detection of an emission at the second wavelength may confirm the exposure of the quantum dot 10 to sufficient UV radiation to degrade outer shell 14, it does not necessarily provide an indication of the intensity of the UV radiation. That is, sufficient UV radiation may be attained through cumulative exposure to a relatively low level of illumination, or sufficient UV radiation may be attained via a brief but energetic exposure.

Suitable and illustrative core/shell quantum dots for the purposes of this disclosure may incorporate an inner core that may include one or more of InP, CdSe, CdSeS, CdTe, ZnS, and ZnO, among others. The illustrative core/shell quantum dots may incorporate an outer shell that may include one or more of CdS, ZnSe, and ZnS, among others. Methods of synthesizing, characterizing, and modifying the optical properties of quantum dots have been well described. For example, a variety of CdSe/ZnS core/shell quantum dots have been prepared and characterized previously (see Dabbousi et al. *J. Phys. Chem. B* 1997, 101, 9463-9475; van Embden et al. *Langmuir*, 2005 21, 10226-10233).

Example 2

This example describes a method of manufacturing a pre-impregnated composite material that comprises core/shell quantum dots. FIG. 4 is a flowchart 30 illustrating operations performed in an illustrative method, and may not recite the complete process or all steps of the program. Flowchart 30 depicts multiple steps of a method of manufacturing a pre-impregnated composite material, and although various steps of flowchart 30 are described below and depicted in FIG. 4, the steps need not necessarily all be performed, and in some cases may be performed in a different order than the order shown.

The manufacture of a pre-impregnated composite material, or prepreg, may include forming a bed of fibers, at 32 of flowchart 30.

The fibers used to form the fiber bed may be uniform or non-uniform, and may have similar or different compositions. In some embodiments, the fibers may be polymer-based, including polyester polymers such as polyethylene, or polyamide polymers such as poly-aramid, among others. The fibers may be derived from natural sources, such as plants, for example flax, hemp, or agave, among others. The fibers may be or include glass fibers or fused quartz fibers. The fibers may include filamentary crystals. The fibers may include continuous fibers of refractory compounds. The fibers may include asbestos fibers, beryllium fibers, beryllium carbide fibers, or beryllium oxide fibers. The fibers may include boron fibers or boron nitride fibers. In one illustrative example the fibers may include carbon fibers, such as graphite fibers. The fibers may include woven fibers or non-woven fibers.

The fiber bed, once formed, is then contacted with a resin matrix, at 34 of flowchart 30. The resin matrix may include a thermoset resin. In particular, the resin matrix may include one or more of an epoxy resin, a phenolic resin, a polyester resin, a polyurethane resin, a vinyl ester resin, and a bismaleimide resin.

The manufacture of the composite material includes disposing a plurality of core/shell quantum dots on or in the resin matrix. In one illustrative example, the plurality of quantum dots is disposed on or in the resin matrix prior to contacting the fiber bed with the resin matrix, at 36 of flowchart 30. In order for the quantum dots to serve as useful indicators of UV exposure, the quantum dots may be disposed at or near the surface of the resin. Provided that sufficient quantum dots occur at or near the surface of the resulting prepreg, this may be a satisfactory method of incorporating the quantum dots into the resin.

Alternatively, the plurality of quantum dots is disposed on or in the resin matrix after the resin contacts the fiber bed, at 38 of flowchart 30. This may result in a greater percentage of the plurality of quantum dots localizing at or near a surface of the resin matrix, and therefore remaining accessible to UV radiation exposure.

In one illustrative embodiment of the disclosure, the plurality of quantum dots is disposed on a surface of a prepreg composition, and adheres to the surface either due to the inherent stickiness of the partially cured resin matrix, or through the application of an adhesive.

Alternatively, the plurality of quantum dots may be disposed on a carrier that is configured to be, in turn, attached to a surface of a prepreg composition. The carrier may, for example, include an adhesive backing to facilitate attachment. The carrier may therefore assume the functionality of a label, or sticker, that can be adhered to a surface in such a way that the outward-facing surface of the carrier includes the plurality of quantum dots.

It should be appreciated that the utility of the core/shell quantum dots of the present disclosure in indicating an exposure to UV radiation need not be limited to prepreg compositions, but could be useful in detecting UV exposure of a wide range of materials. In particular, where the plurality of core/shell quantum dots is disposed on a carrier, the carrier may be readily attached to any surface or object in order to facilitate the detection of an exposure of that surface or object to UV radiation.

Example 3

This example describes an apparatus for evaluating suitability of prepreg for the manufacture of composite structures.

FIG. 5 is a schematic depiction of a detection apparatus 40. The detection apparatus 40 may be configured to employ changes in the optical properties of the core/shell quantum dots disclosed herein to evaluate a prepreg composition, and in particular may be configured to employ the luminescence properties of the core/shell quantum dots to evaluate a prepreg composition.

Luminescence-based analytical methods may involve (1) exposing a sample to a condition capable of inducing luminescence from the sample, and (2) observing a detectable luminescence response, where the luminescence response is indicative of a condition of interest.

The detectable luminescence response generally comprises a change in, or an occurrence of, a luminescence signal that is detectable by direct visual observation and/or by suitable instrumentation. Typically, the detectable response is a change in a property of the luminescence, such as a change in the intensity, polarization, lifetime, and/or excitation or emission wavelength distribution of the luminescence. For example, a condition of interest or a change in a condition of interest may be measured as the appearance of increase of sample luminescence.

The detectable response may be simply detected, or it may be quantified. A response that is simply detected generally comprises a response whose existence merely is confirmed, whereas a response that is quantified generally comprises a response having a quantifiable (e.g., numerically reportable) value such as an intensity, polarization, and/or other property.

Scanning apparatus 40 may include an excitation source 42, and a detector 44. Excitation source 42 may be any light source capable of exciting the inner core of the core/shell quantum dot present in the prepreg composition. The prepreg may be excited by a light source capable of producing light at or near a wavelength of peak absorption of the inner core, such as for example an arc lamp, a fluorescent bulb, or even an incandescent bulb. The prepreg may be excited with light having a wavelength within 20 nm of the maximum absorption of the inner core of the quantum dot, although excitation by a source more aligned with maximum absorption band of the inner core may result in higher sensitivity. Excitation sources may include, for example, fixed, hand-held, or movable lamps, including mercury arc lamps and xenon lamps, and laser light sources such as argon-ion lasers, diode lasers, and Nd-YAG lasers, among others.

The detectable luminescence response of the quantum dot present in or on the resin matrix of the prepreg may be detected qualitatively, or optionally quantitatively. The luminescence response is typically detected by the human eye by simple observation, or by a detector 44 that may include one or more of a CCD camera, a video cameras, photographic film, or other light-sensing apparatus. Detector 44 may be operatively coupled with a computer 46 that may be configured to store and/or analyze the data obtained by detector 44.

As shown in FIG. 5, detection apparatus 40 may be stationary with respect to a prepreg composition 50, or it may scan the surface of the prepreg 50. Scanning may be accomplished by translating one or both of the excitation source 42 and detector 44 along prepreg 50, or by using a pivoting or rotating mirror 48 to scan the prepreg while the detector remains stationary.

Figure 6:
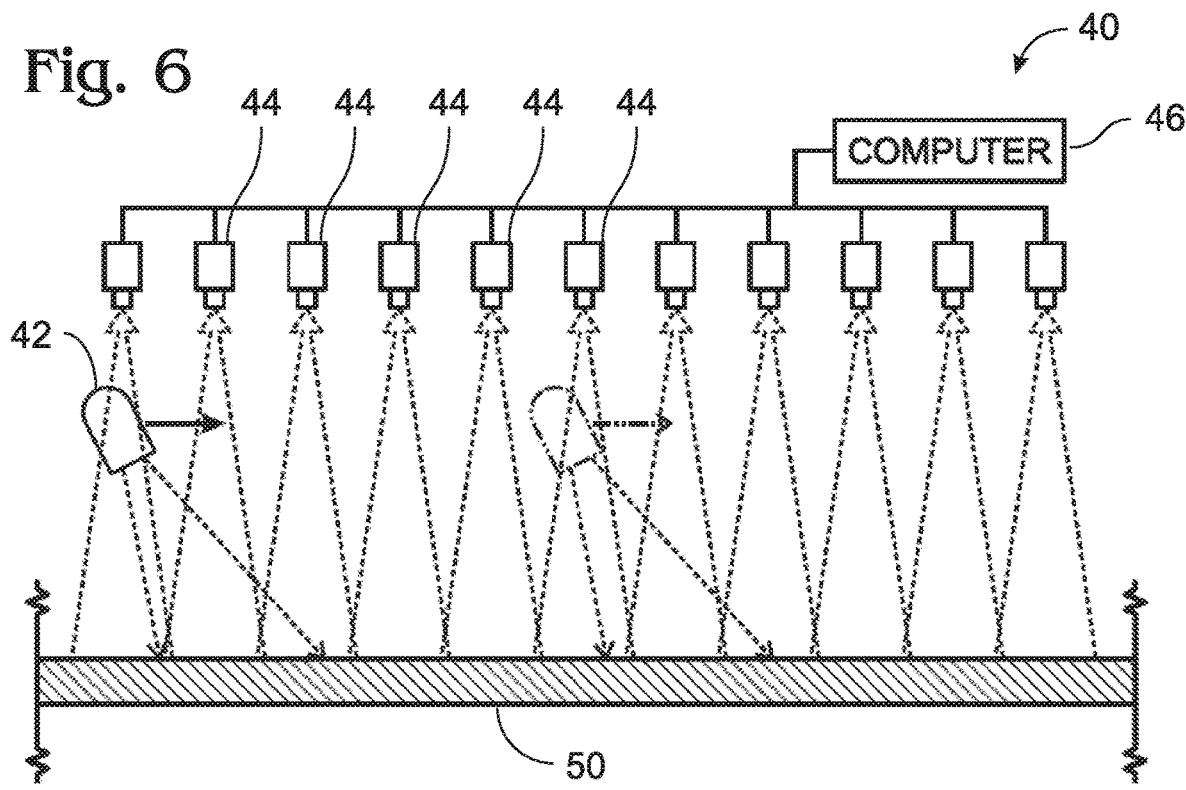
FIG. 6 is a schematic depiction of an alternative illustrative apparatus for detecting the exposure of a prepreg composition to UV radiation.

As shown in FIG. 6, the detection apparatus 40 may alternatively, or additionally, include a scanning excitation source 42 and a plurality of detectors 44 operatively coupled to a computer 46. Using such an apparatus, an image of an entire surface of a prepreg composition may be detected and/or recorded at once. In this way, localized luminescence patterns may be detected, which may identify particular areas of concern and/or help identify the source of stray UV light that may compromise the prepreg during storage.

Example 4

This example describes a method of determining a suitability of prepreg for incorporation into a composite structure. As discussed above, prepreg may include a fiber bed incorporated into a resin matrix. Typically, the resin matrix of the prepreg is at least partially cured, and may be cured to the B-stage. The curing process of a prepreg may be halted at the B-stage, by cooling the prepreg at the appropriate intermediate stage of curing.

Once it is partially cured, even when the prepreg may be kept at low temperatures to prevent further curing, accidental and/or unavoidable exposure to UV radiation may cause additional curing of the resin. This additional curing may render the prepreg unsuitable for use in fabricating a composite material. For example, unwanted additional curing may compromise the ability of the resin to flow under heat and pressure, resulting in unsatisfactory compaction during incorporation of the prepreg into a composite structure and an unsuitable composite structure.

A prepreg may be considered suitable for fabrication of a composite structure when the prepreg resin retains enough capacity for further curing that the resin component of the prepreg will flow under applied heat and/or pressure. More specifically, a prepreg may be considered suitable for fabrication of a composite structure when the prepreg retains sufficient capacity for further curing that the prepreg undergoes adequate compaction during autoclaving, and the composite structure incorporating the prepreg satisfies the quality control standards for that structure.

A prepreg may be considered unsuitable for fabrication of a composite structure when the prepreg has undergone sufficient additional curing that the prepreg fails to exhibit adequate flow and/or compaction even during autoclaving. Alternatively or in addition, a prepreg may be considered unsuitable when a composite structure incorporating the prepreg fails to meet the quality control standards for that composite structure.

A standard test may be used to evaluate the resin flow characteristics of a prepreg, in order to evaluate suitability of that prepreg. For example, ASTM International has established a standard test methodology for evaluating the amount of resin flow that will occur for a given prepreg tape or sheet under defined conditions of temperature and pressure (see ASTM Intel. Test Method D3531/D3531M-11, hereby incorporated by reference). The core/shell quantum dots of the present disclosure may be tailored to generate a luminescent signal after exposure to an amount of UV radiation correlating to a desired level of change in resin flow characteristics, as measured by such a standard test method. It should be appreciated that through appropriate design and synthesis, a core/shell quantum dot may be prepared that would indicate a change in resin flow characteristics of, for example, 2%, 5%, 10%, 20%, 30%, 40%, 50%, 60%, 70%, 80%, 90%, 100%, or more.

Alternatively, or in addition, a standard test may be used to evaluate the tensile strength of a prepreg material, or a composite structure fabricated from a prepreg material, and the exposure of the prepreg material to UV radiation may be correlated with a loss of strength or integrity of the resulting composite structure, as determined by a standard tensile or pull-test. In this instance, the core/shell quantum dots of the present disclosure may be tailored to generate a luminescent signal when the prepreg has been exposed to an amount of UV radiation correlating to a target decrease in tensile strength, as measured by a standard tensile or pull-test, for example, a decrease of 2%, 5%, 10%, 20%, 30%, 40%, 50%, 60%, 70%, 80%, 90%, 100%, or more.

Figure 7:
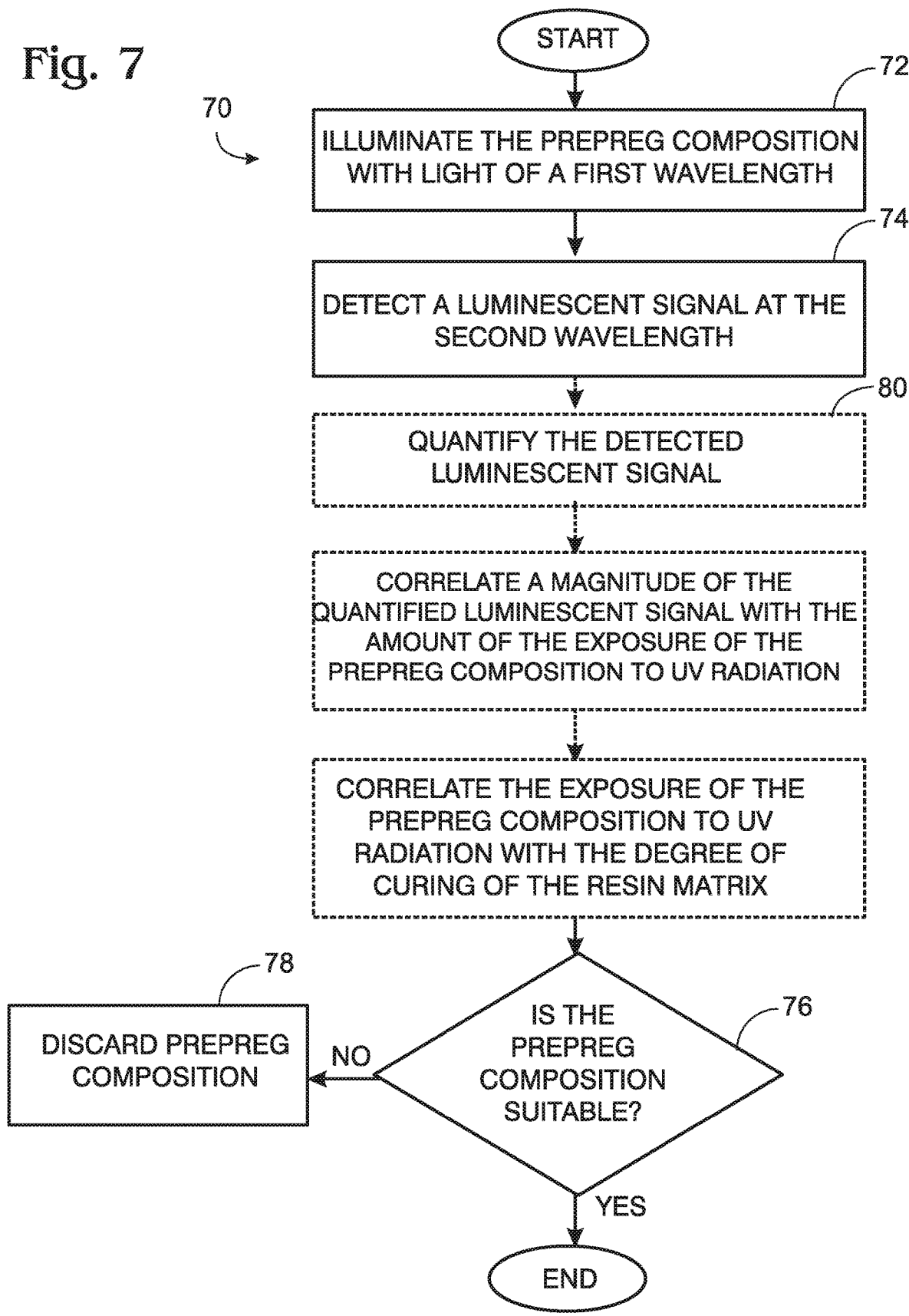
FIG. 7 is a flowchart depicting an illustrative method of determining the suitability of a prepreg composition for incorporation into a composite structure.

FIG. 7 includes flowchart 70 of operations performed in an illustrative method of determining the suitability of a prepreg for incorporation into a composite structure. Flowchart 70 may not recite the complete process or all steps of the process, and although various steps of flowchart 70 are described below and depicted in FIG. 7, the steps need not necessarily all be performed, and in some cases may be performed in a different order than the order shown.

The method depicted by flowchart 70 includes determining the suitability of a prepreg for incorporation into a composite structure, where the prepreg composition comprising a bed of fibers disposed in a resin matrix, and that includes a plurality of core/shell quantum dots as described above. At 72 of flowchart 70, the prepreg composition is illuminated with light of the first wavelength. At 74, the luminescent signal generated by the quantum dots at the second wavelength is detected. At 76, the suitability of the prepreg composition for incorporation in a composite structure is determined, based upon at least the detected luminescent signal at the second wavelength.

In one aspect of the method, the core/shell quantum dots are selected such that the detection of any luminescence signal at the second wavelength may be sufficient to make a determination that the prepreg has been compromised by exposure to UV radiation, and that the incorporation of that prepreg into a composite structure may negatively impact the strength, stability, lifetime, or other characteristic of the composite structure. That is, the core/shell quantum dots are configured such that an amount of UV exposure sufficient to degrade the outer shell of the quantum dot and expose the inner core to the UV radiation has been experimentally and/or theoretically determined to be a sufficient amount of UV exposure to render a prepreg composition incorporating the quantum dot unsuitable for use. As shown at 76, based upon the detected luminescent signal, a determination that the prepreg is not suitable for further use may result in discarding the prepreg, at 78. Alternatively, the absence of a detectable luminescent signal at the second wavelength may be used to indicate that the prepreg remains suitable for use in manufacturing the desired composite structure.

Optionally, the detectable luminescent response may be quantified, at 80, where quantification may correspond to determining the intensity, or magnitude, of the luminescence response in a systematic way. Accurate quantification of the luminescence response may be enhanced by calibration of detector 44 and/or computer 46 before, during, or after the luminescent signal at the second wavelength is detected.

Once the luminescence response is quantified, the quantified signal may be correlated with exposure of the prepreg to UV radiation, at 72. Such a correlation may be performed by comparison of the detected and/or recorded luminescence response to a prepared luminescence standard or to a standard curve. For example, the measured luminance response may be compared with that obtained from a standard composition of a known concentration of quantum dots in a known composition of prepreg, having been exposed to a known amount of UV radiation. Alternatively, or in addition, a standard curve may be prepared, using variable exposure of a test sample to increasing intensity and/or duration of UV exposure and recording the resulting luminescence response, so that the quantified luminescent signal may be used to interpolate a value for the amount of UV radiation to which the prepreg may have been exposed.

Also optionally, and as shown at 74 of flowchart 60, the amount of exposure of the prepreg to UV radiation may be further correlated with the degree of curing such an exposure may create within the resin matrix. Again, such correlation may require the creation of a standard curve.

Figure 8:
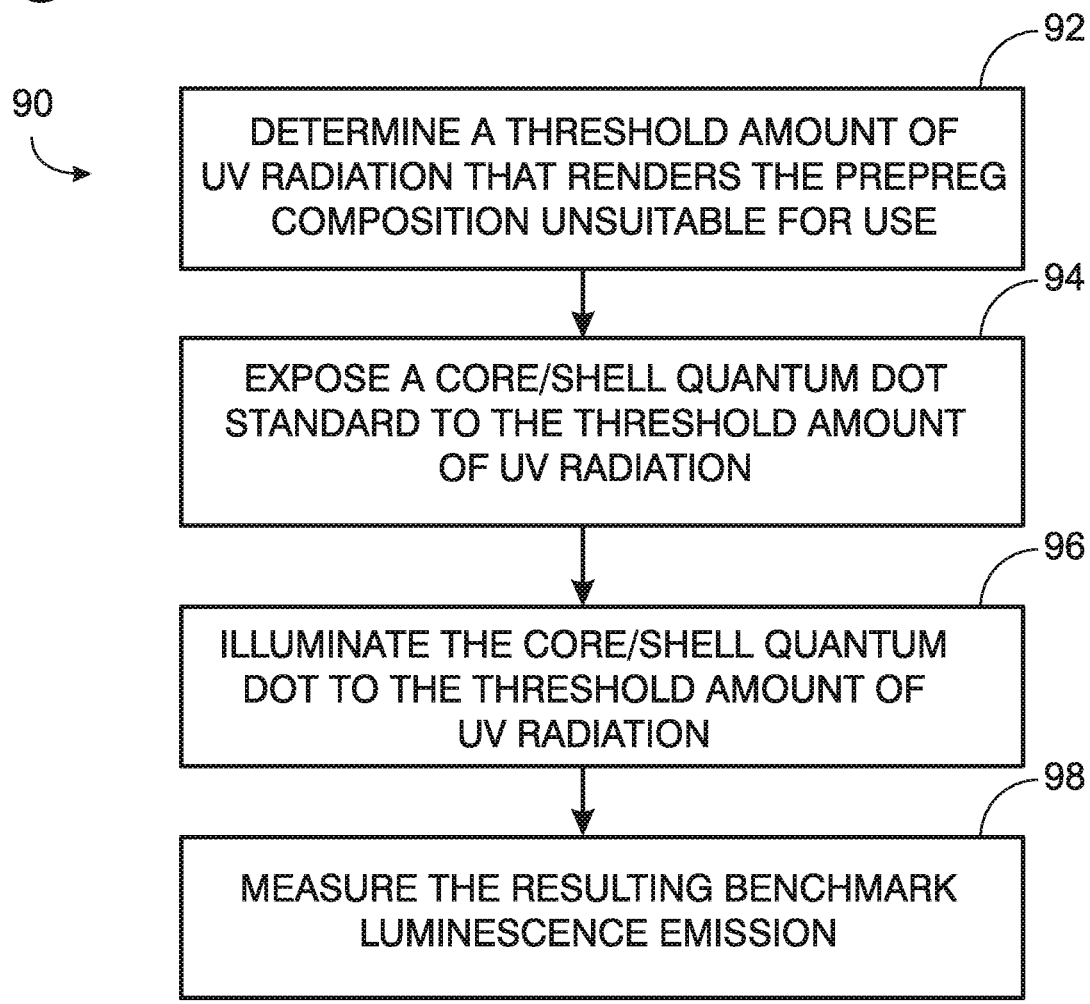
FIG. 8 is a flowchart depicting an illustrative method of determining benchmark value for luminescence emission of a core/shell quantum dot standard.

FIG. 8 illustrates a flowchart 90 of an illustrative method of obtaining a benchmark luminescence emission, where the benchmark luminescence emission may be used in conjunction with the process of flowchart 70 to determine the suitability of a prepreg composition for incorporation into a composite structure.

In order to determine how much UV radiation exposure will result in a prepreg that is unsuitable for further use, a threshold amount of UV radiation may be determined, at 92 of flowchart 90. The threshold amount of UV radiation is that amount sufficient to render a prepreg composition unsuitable for use in fabricating a composite structure, typically due to excessive curing of the resin. This threshold value may be determined theoretically, or may be determined empirically through testing.

Once the threshold amount of UV radiation is determined, a standard or control sample of core/shell quantum dots as discussed above are exposed to the threshold amount of UV radiation, at 94. After such exposure, the sample of core/shell quantum dots is then illuminated with light of the first wavelength, at 96. The resulting luminescence emission of the quantum dots is measured, at 98. This measured luminescence corresponds to a benchmark luminescence. That is, the benchmark luminescence is that amount of luminescence that, when generated by the quantum dots in a prepreg compositions, may be correlated with an exposure of the prepreg composition to the threshold amount of UV radiation. More simply, where a prepreg composition is illuminated by light of the first wavelength and generates the benchmark level of luminescence at the second wavelength, the prepreg composition may therefore be considered unsuitable for incorporation into a composite structure.

Example 5

This section describes additional aspects and features of the prepreg compositions of the present disclosure, their manufacture, and their evaluation, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations. Each of the paragraphs including the term "substantially" may also be provided in the same form excepting that the term "substantially" is deleted.

A0. A method of manufacturing a prepreg composition, comprising:
forming a bed of fibers;
contacting the fiber bed with a resin matrix; and
disposing a plurality of core/shell quantum dots on or in the resin matrix.

A1. The method of paragraph A0, wherein the plurality of core/shell quantum dots exhibit a detectable optical response when exposed to an amount of UV radiation sufficient to render the prepreg composition unsuitable for use in fabricating composite structures.

A2. The method of paragraph A1, wherein each quantum dot includes an inner core covered by an outer shell, the inner core being configured such that when excited by light of a first wavelength the inner core emits a detectable luminescent signal at a second wavelength;
the outer shell being configured to substantially block light of the first wavelength from reaching the inner core when the outer shell is intact; and
the outer shell being further configured such that exposure to a threshold amount of UV radiation results in sufficient degradation that the inner core emits the detectable luminescent signal when the quantum dot is illuminated by light having the first wavelength;
wherein the threshold amount of UV radiation is the amount sufficient to render the prepreg composition unsuitable for use in fabricating composite structures.

A2a. The method of paragraph A1, wherein each quantum dot includes an inner core covered by an outer shell, the inner core being configured such that when excited by light of a first wavelength the inner core emits a detectable luminescent signal at a second wavelength;
the outer shell being configured to block light of the first wavelength from reaching the inner core when the outer shell is intact; and
the outer shell being further configured such that exposure to a threshold amount of UV radiation results in sufficient degradation that the inner core emits the detectable luminescent signal when the quantum dot is illuminated by light having the first wavelength;
wherein the threshold amount of UV radiation is the amount sufficient to render the prepreg composition unsuitable for use in fabricating composite structures.

A3. The method of paragraph A0, wherein contacting the fiber bed with a resin matrix includes contacting the fiber bed with a thermoset resin.

A4. The method of paragraph A0, wherein the plurality of core/shell quantum dots are disposed on or in the resin matrix before the resin matrix contacts the fiber bed.

A5. The method of paragraph A0, wherein the plurality of core/shell quantum dots are disposed on or in the resin matrix after the resin matrix contacts the fiber bed.

A6. The method of paragraph A2 or A2a, wherein the outer shell is configured so that exposing the outer shell to UV radiation does not result in a detectable luminescent signal that substantially overlaps with the second wavelength.

A7. The method of paragraph A2 or A2a, wherein the outer shell is configured so that exposing the outer shell to UV radiation does not result in a detectable luminescent signal.

A8. The method of paragraph A0, where partially curing the prepreg composition includes curing the prepreg composition to B-stage.

A9. The method of paragraph A0, where partially curing the prepreg composition includes cooling the prepreg composition to stop the curing process.

A10. The method of paragraph A0, further comprising storing the partially cured prepreg composition in cold storage.

A11. The method of paragraph A0, where the fiber bed includes woven fibers.

A12. The method of paragraph A0, where the fiber bed includes non-woven fibers.

A13. The method of paragraph A0, where the plurality of core/shell quantum dots includes double shell or triple shell quantum dots.

B0. A prepreg composition comprising:
a bed of fibers disposed in a resin matrix; and
a plurality of core/shell quantum dots disposed on or in a partially cured resin matrix;
 wherein the plurality of core/shell quantum dots exhibit a detectable optical response when exposed to an amount of UV radiation sufficient to render the prepreg composition unsuitable for use in fabricating composite structures.

B1. The prepreg composition of paragraph B0, wherein each quantum dot includes an inner core covered by an outer shell, the inner core being configured such that when excited by light of a first wavelength the inner core emits a detectable luminescent signal at a second wavelength;
 the outer shell being configured to substantially block light of the first wavelength from reaching the inner core when the outer shell is intact; and
 the outer shell being further configured to degrade upon exposure to UV radiation such that detection of the luminescent signal at the second wavelength indicates that the quantum dot has been exposed to UV radiation;
 wherein at least some of the quantum dots are at or on a resin surface and accessible to illumination.

B2. The prepreg composition of paragraph B0, where the prepreg composition is cured to B-stage.

B3. The prepreg composition of paragraph B0, where the resin matrix includes a thermoset resin.

B4. The prepreg composition of paragraph B0, where the resin matrix includes an epoxy resin, a phenolic resin, or a bismaleimide resin.

B5. The prepreg composition of paragraph B0, where the bed of fibers includes woven fibers.

B6. The prepreg composition of paragraph B0, where the bed of fibers includes non-woven fibers.

C0. A resin composition, comprising:
an uncured resin;
a plurality of core/shell quantum dots dispersed in the resin material;
 where each quantum dot includes an inner core covered by an outer shell, the inner core being configured such that when excited by light of a first wavelength the inner core emits a detectable luminescent signal at a second wavelength;
 the outer shell being configured to substantially block light of the first wavelength from reaching the inner core when the outer shell is intact; and
 the outer shell being further configured to degrade upon exposure to UV radiation such that detection of the luminescent signal at the second wavelength indicates that the quantum dot has been exposed to UV radiation.

C1. The resin composition of paragraph C0, where the uncured resin is an uncured thermoset resin.

C2. The resin composition of paragraph C1, further comprising one or more additives selected from among curing agents, hardeners, tougheners, accelerators, and flame retardants.

D0. A prepreg composition comprising:
a bed of fibers disposed in a resin matrix; and
a plurality of core/shell quantum dots; wherein the plurality of core/shell quantum dots exhibit a detectable optical response when exposed to an amount of UV radiation sufficient to render the resin matrix unsuitable for use in fabricating composite structures.

D1. The prepreg composition of paragraph D0, wherein each quantum dot comprises an inner core covered by an outer shell, the inner core being configured such that when excited by light of a first wavelength the inner core emits a detectable luminescent signal at a second wavelength;
the outer shell being configured to substantially block light of the first wavelength from reaching the inner core when the outer shell is intact; and
the outer shell being further configured such that exposure to a threshold amount of UV radiation results in sufficient degradation that the inner core emits the detectable luminescent signal when the quantum dot is illuminated by light having the first wavelength;
wherein the threshold amount of UV radiation is an amount sufficient to render the prepreg composition unsuitable for use in fabricating composite structures.

D1a. The prepreg composition of paragraph D0, wherein each quantum dot comprises an inner core covered by an outer shell, the inner core being configured such that when excited by light of a first wavelength the inner core emits a detectable luminescent signal at a second wavelength;
the outer shell being configured to block light of the first wavelength from reaching the inner core when the outer shell is intact; and
the outer shell being further configured such that exposure to a threshold amount of UV radiation results in sufficient degradation that the inner core emits the detectable luminescent signal when the quantum dot is illuminated by light having the first wavelength;

wherein the threshold amount of UV radiation is an amount sufficient to render the prepreg composition unsuitable for use in fabricating composite structures.

D2. The composition of paragraph D0, wherein each core/shell quantum dot has an inner core comprising one or more of InP, CdSe, CdSeS, CdTe, ZnS, and ZnO; and an outer shell comprising one or more of CdS, ZnSe, and ZnS.

D3. The composition of paragraph D0, wherein each core/shell quantum dot is a CdSe/ZnS core/shell quantum dot.

D4. The prepreg composition of paragraph D1 or D1a, wherein the outer shell is substantially nonluminescent at the second wavelength when exposed to UV radiation.

D4a. The prepreg composition of paragraph D1 or D1a, wherein the outer shell is nonluminescent at the second wavelength when exposed to UV radiation.

D5. The prepreg composition of paragraph D1 or D1a, wherein the outer shell is substantially nonluminescent when exposed to UV radiation.

D5a. The prepreg composition of paragraph D1 or D1a, wherein the outer shell is nonluminescent when exposed to UV radiation.

D6. The prepreg composition of paragraph D0, wherein the resin matrix includes a thermoset resin.

D7. The prepreg composition of paragraph D0, wherein the resin matrix includes one or more of an epoxy resin, a phenolic resin, a polyester resin, a polyurethane resin, a vinyl ester resin, and a bismaleimide resin.

D8. The prepreg composition of paragraph D0, wherein the bed of fibers comprises at least one of woven fibers and non-woven fibers.

D9. The prepreg composition of paragraph D0, wherein the bed of fibers comprises one or more of synthetic polymer fibers and natural fibers derived from plant sources.

D10. The prepreg composition of paragraph D0, wherein the bed of fibers comprises one or more of carbon fibers, boron fibers, and boron nitride fibers.

E0. A core/shell quantum dot, comprising:
an inner core covered by an outer shell, the inner core being configured such that when excited by light of a first wavelength the inner core emits a detectable luminescent signal at a second wavelength;
the outer shell being configured to substantially block light of the first wavelength from reaching the inner core when the outer shell is intact; and
the outer shell being further configured to degrade upon exposure to UV radiation such that detection of the luminescent signal at the second wavelength indicates that the quantum dot has been exposed to UV radiation.

E1. The quantum dot of paragraph E0, where the inner core/outer core has a composition of CdS/ZnS, CdSe/ZnS, CdSe/CdS, or InAs/CdSe.

E2. The quantum dot of paragraph E0, wherein the quantum dot is disposed on a carrier that is configured to be attached to a surface.

E3. The quantum dot of paragraph E2, wherein the carrier is an adhesive carrier configured to be adhered to the surface.

F0. A method of determining a suitability of a prepreg composition for incorporation into a composite structure, comprising:
illuminating the prepreg composition with light of a first wavelength, wherein the prepreg composition comprises a plurality of core/shell quantum dots disposed on or in the resin matrix, each quantum dot including an inner core covered by an outer shell;
the inner core being such that when excited by light of the first wavelength the inner core emits a detectable luminescent signal at a second wavelength;
the outer shell being configured to substantially block light of the first wavelength from reaching the inner core when the outer shell is intact; and
the outer shell being further configured to degrade upon exposure to UV radiation such that a detection of the luminescent signal at the second wavelength indicates that the quantum dot has been exposed to UV radiation;
detecting the luminescent signal at the second wavelength from the inner core; and
determining a suitability of the prepreg composition for incorporation in a composite structure based upon at least the presence of the detected luminescent signal at the second wavelength.

F0a. A method of determining a suitability of a prepreg composition for incorporation into a composite structure, comprising:
illuminating the prepreg composition with light of a first wavelength, wherein the prepreg composition comprises a plurality of core/shell quantum dots disposed on or in the resin matrix, each quantum dot including an inner core covered by an outer shell;
the inner core being such that when excited by light of the first wavelength the inner core emits a detectable luminescent signal at a second wavelength;
the outer shell being configured to block light of the first wavelength from reaching the inner core when the outer shell is intact; and
the outer shell being further configured to degrade upon exposure to UV radiation such that a detection of the luminescent signal at the second wavelength indicates that the quantum dot has been exposed to UV radiation;
detecting the luminescent signal at the second wavelength from the inner core; and
determining a suitability of the prepreg composition for incorporation in a composite structure based upon at least the presence of the detected luminescent signal at the second wavelength.

F1. The method of paragraph F0 or F0a, further comprising:
quantifying the detected luminescent signal; and
correlating a magnitude of the quantified luminescent signal with an amount of exposure of the prepreg composition to UV radiation.

F2. The method of paragraph F1, wherein correlating the quantified luminescent signal with the amount of exposure of the prepreg composition to UV radiation includes comparing the quantified luminescent signal with a benchmark luminescence emission;
wherein the benchmark luminescence emission is obtained by:
determining a threshold amount of UV radiation sufficient to render the prepreg composition unsuitable for use in fabricating the composite structure;
exposing a core/shell quantum dot standard to the threshold amount of UV radiation;
illuminating the core/shell quantum dot standard with light of the first wavelength; and
measuring the resulting benchmark luminescence emission.

F3. The method of paragraph F0 or F0a, wherein illuminating the prepreg composition includes illuminating a surface of the prepreg composition with light of the first wavelength.

F4. The method of paragraph F0 or F0a, where detecting the luminescent signal at the second wavelength includes exposing a surface of the prepreg composition to a detector.

F5. The method of paragraph F0 or F0a, wherein detecting the luminescent signal at the second wavelength includes localizing the luminescent signal on a surface of the prepreg composition.

G0. A method of detecting an exposure of a prepreg composition to UV radiation, comprising:
forming a prepreg composition that includes a bed of fibers and a plurality of core/shell quantum dots bound in a partially cured resin matrix, where
  each quantum dot includes an inner core covered by an outer shell, the inner core being configured such that when excited by light of a first wavelength the inner core emits a detectable luminescent signal at a second wavelength;
  the outer shell being configured to substantially block light of the first wavelength from reaching the inner core when the outer shell is intact; and
  the outer shell being further configured to degrade upon exposure to UV radiation such that detection of the luminescent signal at the second wavelength indicates that the quantum dot has been exposed to UV radiation;
illuminating the prepreg composition with light of the first wavelength;
detecting a luminescent signal at the second wavelength from the quantum dots;
correlating the detected luminescent signal with exposure of the prepreg composition to UV radiation.

G1. The method of paragraph G0, further comprising:
quantifying the detected luminescent signal; and
correlating the quantified luminescent signal with an amount of exposure of the prepreg composition to UV radiation.

G2. The method of paragraph G1, further comprising:
correlating the amount of exposure of the prepreg composition to UV radiation with a suitability of the prepreg composition for fabricating composite structures.

G3. The method of paragraph G1, where illuminating the prepreg composition includes scanning light of the first wavelength across the surface of the prepreg composition.

G4. The method of paragraph G3, where illuminating the prepreg composition includes generating light of the first wavelength with an excitation source.

G5. The method of paragraph G4, where illuminating the prepreg composition includes generating light of the first wavelength with an excitation source that is a laser excitation source.

G6. The method of paragraph G0, where detecting the luminescent signal at the second wavelength includes using a detector sensitive to light at the second wavelength.

G7. The method of paragraph G6, where detecting the luminescent signal at the second wavelength includes scanning across a surface of the prepreg composition with the detector.

G8. The method of paragraph G6, where detecting the luminescent signal at the second wavelength includes exposing an entire surface of the prepreg composition to the detector simultaneously.

G9. The method of paragraph G6, where detecting the luminescent signal includes using detector that includes a CCD or CMOS sensor.

G10. The method of paragraph G6, where detecting the luminescent signal at the second wavelength includes localizing the luminescent signal on a surface of the prepreg composition.

H0. A method of detecting exposure of a composition to UV radiation, comprising:
incorporating a plurality of core/shell quantum dots in or on the composition, where
  each quantum dot includes an inner core covered by an outer shell, the inner core being configured such that when excited by light of a first wavelength the inner core emits a detectable luminescent signal at a second wavelength;
  the outer shell being configured to substantially block light of the first wavelength from reaching the inner core when the outer shell is intact; and
  the outer shell being further configured to degrade upon exposure to UV radiation such that detection of the luminescent signal at the second wavelength indicates that the quantum dot has been exposed to UV radiation;
illuminating the composition with light of the first wavelength;
detecting a luminescent signal at the second wavelength from the quantum dots;
correlating the detected luminescent signal with exposure of the composition to UV radiation.

I0. A method of detecting damage to a prepreg composition due to UV radiation exposure, comprising:
a) forming a bed of fibers;
b) contacting the fiber bed with a resin matrix;
c) disposing a plurality of core/shell quantum dots on or in the resin matrix to form the prepreg composition; and
d) detecting a detectable optical response from the plurality of core/shell quantum dots when exposed to an amount of UV radiation sufficient to render the prepreg composition unsuitable for use in fabricating composite structures.

Advantages, Features, Benefits

The different embodiments of prepreg compositions, their manufacture, and their evaluation described herein provide several advantages over known solutions for addressing the degradation of prepreg due to UV exposure. More specifically, the presently described methods permit for fast and cost-effective characterization of UV exposure of composite materials prior to manufacturing, potentially resulting in significant cost savings. In addition, the methods described herein may be applied to any other industry or material where exposure to UV or other radiation sources may compromise product quality.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A method of manufacturing a prepreg composition, comprising:
    forming a bed of fibers;
    contacting the fiber bed with a resin matrix; and
    disposing a plurality of core/shell quantum dots on or in the resin matrix, wherein:
        each quantum dot includes an inner core covered by an outer shell;
        the inner core is such that when excited by light of a first wavelength the inner core emits a detectable luminescent signal at a second wavelength;
        the outer shell is such that it blocks light of the first wavelength from reaching the inner core when the outer shell is intact; and
        the outer shell is such that it degrades upon exposure to UV radiation such that a detection of the luminescent signal at the second wavelength indicates that the quantum dot has been exposed to UV radiation.

2. The method of claim 1, wherein the detection of the luminescent signal at the second wavelength indicates that the plurality of core/shell quantum dots have been exposed to an amount of UV radiation sufficient to render the prepreg composition unsuitable for use in fabricating composite structures.

3. The method of claim 2, wherein the detectable luminescent signal of the plurality of core/shell quantum dots is a detectable optical response.

4. The method of claim 3, wherein the detectable luminescent signal of the plurality of core/shell quantum dots is a detectable increase in luminescence.

5. The method of claim 2, wherein each outer shell is further configured such that exposure to a threshold amount of UV radiation results in sufficient degradation that the inner core emits the detectable luminescent signal when the quantum dot is illuminated by light having the first wavelength;
    wherein the threshold amount of UV radiation is the amount sufficient to render the prepreg composition unsuitable for use in fabricating composite structures.

6. The method of claim 5, wherein each outer shell is substantially nonluminescent at the second wavelength when exposed to UV radiation.

7. The method of claim 5, wherein each outer shell is substantially nonluminescent when exposed to UV radiation.

8. The method of claim 1, wherein contacting the fiber bed with a resin matrix includes contacting the fiber bed with a thermoset resin.

9. The method of claim 1, wherein the plurality of core/shell quantum dots are disposed on or in the resin matrix before the resin matrix contacts the fiber bed.

10. The method of claim 1, wherein the plurality of core/shell quantum dots are disposed on or in the resin matrix after the resin matrix contacts the fiber bed.

11. The method of claim 1, wherein disposing a plurality of core/shell quantum dots on or in the resin matrix includes disposing a plurality of core/shell quantum dots having an inner core comprising one or more of InP, CdSe, CdSeS, CdTe, ZnS, and ZnO; and an outer shell comprising one or more of CdS, ZnSe, and ZnS on or in the resin matrix.

12. The method of claim 1, wherein disposing a plurality of core/shell quantum dots on or in the resin matrix includes disposing a plurality of core/shell quantum dots that are CdSe/ZnS core/shell quantum dots on or in the resin matrix.

13. A method of determining a suitability of a prepreg composition for incorporation into a composite structure, comprising:
    illuminating the prepreg composition with light of a first wavelength, wherein the prepreg composition comprises:
        a bed of fibers disposed in a partially cured resin matrix; and
        a plurality of core/shell quantum dots disposed on or in the resin matrix, each quantum dot including an inner core covered by an outer shell;
            the inner core being such that when excited by light of the first wavelength the inner core emits a detectable luminescent signal at a second wavelength;
            the outer shell being such that it blocks light of the first wavelength from reaching the inner core when the outer shell is intact; and
            the outer shell further being such that it degrades upon exposure to UV radiation such that a detection of the luminescent signal at the second wavelength indicates that the quantum dot has been exposed to UV radiation;
    detecting the luminescent signal at the second wavelength from the inner core; and
    determining a suitability of the prepreg composition for incorporation in a composite structure based upon at least the presence of the detected luminescent signal at the second wavelength.

14. The method of claim 13, further comprising:
    quantifying the detected luminescent signal; and
    correlating a magnitude of the quantified luminescent signal with an amount of exposure of the prepreg composition to UV radiation.

15. The method of claim 14, wherein correlating the magnitude of the quantified luminescent signal with the amount of exposure of the prepreg composition to UV radiation includes comparing the quantified luminescent signal with a benchmark luminescence emission;
    wherein the benchmark luminescence emission is obtained by:
        determining a threshold amount of UV radiation sufficient to render the prepreg composition unsuitable for use in fabricating the composite structure;
        exposing a core/shell quantum dot standard to the threshold amount of UV radiation;
        illuminating the core/shell quantum dot standard with light of the first wavelength; and
        measuring the resulting benchmark luminescence emission.

16. The method of claim 14, wherein correlating the magnitude of the quantified luminescent signal with the amount of exposure of the prepreg composition to UV radiation includes comparing the quantified luminescent signal to a standard curve prepared using variable exposure of a test sample to increasing intensity and/or duration of UV exposure and recording the resulting luminescence response;
    further comprising interpolating a value for the amount of UV radiation to which the prepreg composition was exposed.

17. The method of claim 13, wherein detecting the luminescent signal at the second wavelength includes exposing a surface of the prepreg composition to a detector.

18. The method of claim 17, wherein the detector is a camera configured to detect light at the second wavelength.

19. The method of claim 17, wherein the detector is configured to scan the surface of the prepreg composition.

20. A method of detecting damage to a prepreg composition due to UV radiation exposure, comprising:
- a) forming a bed of fibers;
- b) contacting the fiber bed with a resin matrix;
- c) disposing a plurality of core/shell quantum dots on or in the resin matrix to form the prepreg composition, wherein:
  - each quantum dot includes an inner core covered by an outer shell;
  - the inner core is such that when excited by light of a first wavelength the inner core emits a detectable luminescent signal at a second wavelength;
  - the outer shell is such that it blocks light of the first wavelength from reaching the inner core when the outer shell is intact; and
  - the outer shell is such that it degrades upon exposure to UV radiation such that a detection of the luminescent signal at the second wavelength indicates that the quantum dot has been exposed to UV radiation; and
- d) detecting the detectable luminescent signal from the plurality of core/shell quantum dots after exposure to an amount of UV radiation sufficient to render the prepreg composition unsuitable for use in fabricating composite structures.

* * * * *